Patented Sept. 27, 1927.

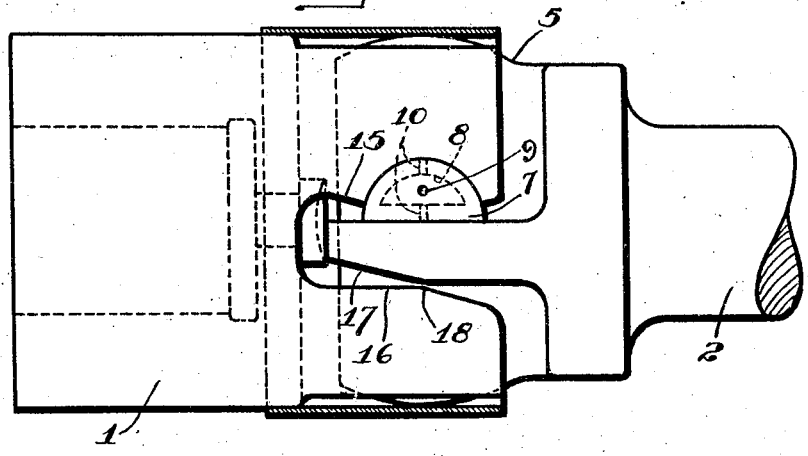
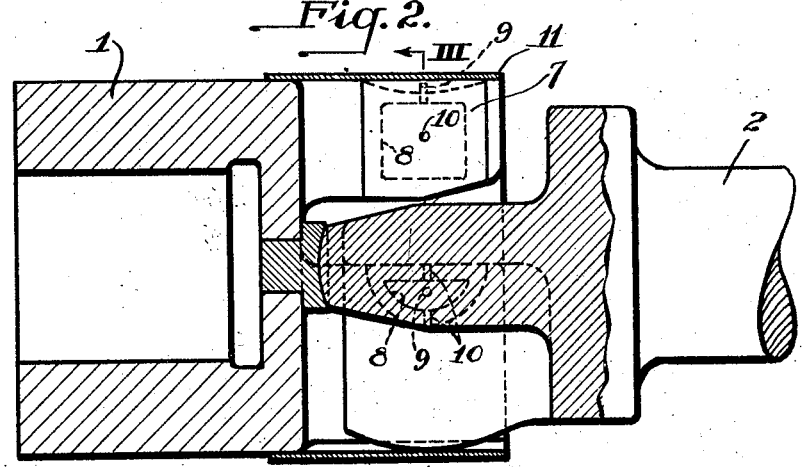
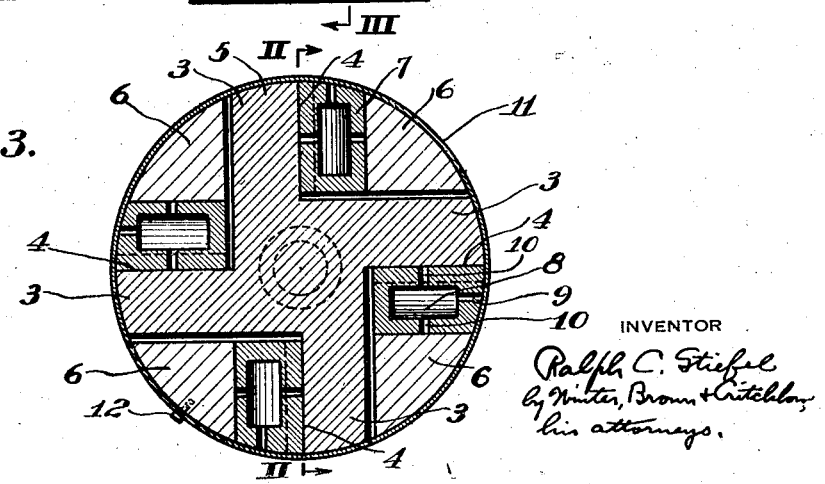

1,643,353

UNITED STATES PATENT OFFICE.

RALPH C. STIEFEL, OF ELLWOOD CITY, PENNSYLVANIA.

UNIVERSAL COUPLING.

Application filed May 14, 1927. Serial No. 191,347.

The invention relates to universal couplings for use in the driving connections of metal working mills, such as rolling mills, billet-piercing mills, and the like, in which couplings high torque is transmitted from one rotary member to another through bearing blocks arranged between interengaging elements formed on the rotary members.

In such couplings it is essential that the interengaging coupling elements be strong enough to resist the heavy stresses imposed upon them, and it is desirable that the unit pressure on the bearing blocks, or brasses as they are usually called, for transmitting torque from one rotary member to another, be a minimum to reduce as much as possible the frequency of their necessary replacement. In addition to these considerations, it is frequently desirable to have the outside dimensions of the coupling as small as possible to avoid, in the case of rolling mill drives, interference between adjacent couplings when the rolls are turned down, and, in the case of skew-roll piercing mills, to afford a clear path for the passage of billets between the rolls.

The object of the invention is to provide a coupling of the type described which is strong and compact, and in which the unit pressure on the bearing blocks is comparatively low.

The invention is illustrated in the accompanying drawings of which Fig. 1 is a side view of the coupling, a retaining ring or sleeve being illustrated in section to show the construction of the coupling; Fig. 2 a longitudinal central section through the coupling, the plane of view being indicated by the line II—II, Fig. 3; and Fig. 3 a transverse sectional view taken on the line III—III, Fig. 2.

According to this invention, a universal coupling is formed on the adjacent ends of two rotary members, either of which may be a spindle or another form of casting or forging adapted to be securely fastened to a driving or driven shaft or spindle. The end of one rotary member is integrally provided with four jaws which extend longitudinally of the member and substantially radially from its axis of rotation, the jaws being integrally united to each other at the axis of rotation of the member. Each jaw is provided with a plane surfaced driving face which lies in a plane passing through the axis of the rotary member, the planes of the several driving faces being disposed at angular intervals of ninety degrees. The adjacent end of the second rotary member is integrally provided with four longitudinally-disposed tongues which extend into the spaces between the jaws of the first-mentioned rotary member, and accordingly intermesh with such jaws. Each of these tongues is provided with a pocket or groove for receiving a bearing block or brass which is of substantially semi-cylindrical form having its curved face bearing upon the wall forming the pocket of the tongue and its plane face bearing upon one of the plane surfaced driving faces of the jaws. In all there are four bearing blocks arranged in four pockets formed in the tongues of the second-mentioned rotary member.

In the illustrative embodiment of the invention one rotary member is indicated as being the end of the casting or forging 1, the other end of which may be suitably secured to a driving shaft or pinion, and the other rotary member is indicated as being a spindle or shaft 2. At the end of spindle 2 there are four jaws 3 which extend longitudinally of the spindle and substantially radially of its axis of rotation. The several jaws are provided with plane surfaced driving faces 4 which lie in planes at right angles to each other passing through the axis of rotation. As shown at 5 in Figs. 1 and 3, the outer or peripheral faces of the jaws are of spherical form.

The end of rotary member 1 is provided with four tongues 6 which extend into the spaces between the jaws 3. Adjacent to the driving faces of each jaw each tongue is provided with a pocket or groove of general semi-cylindrical form for the reception of the curved surface of a substantially semi-cylindrical bearing block or brass 7, there being four of such blocks arranged in the several pockets of the tongues. The plane faces of these bearing blocks lie against the plane driving faces 4 of jaws 3. While the bearing blocks may be variously formed, each is preferably provided with an interior chamber 8 for the reception of lubricant introduced through a passage 9 formed in the outer wall of the block, other of its walls being provided with passages 10 for the flow of lubricant upon the bearing surfaces of the coupling. The bearing blocks may be inserted in their receiving grooves by moving them radially inwardly from the periphery of the coupling, and may be held in their operating positions by a sleeve or ring 11 slidably mounted upon rotary member 1 for telescopic movements, the sleeve being held in its bearing block locking position by suitable screws or equivalent locking members 12.

As shown in Figs. 1 and 2, tongues 6 are provided with tapered faces 15 and 16, and the rear faces of jaws 3 are provided with beveled or tapered faces 17 to permit of the necessary or required relatively universal movements between the two rotary members, it being understood that the tapers or bevels of these members may be varied depending upon the extent of universal movement required in a particular coupling. However, to minimize the permissible extent of back-lash movements it is preferred to have a small clearance between the rear face of each jaw 3 and the adjacent face of each tongue 6 along a line indicated in Fig. 1 at the point 18.

In the operation of the coupling, either rotary member 1 or 2 may be the driving or driven member. Assuming rotary member 1 as being the driving member, driving torque or pressure is transmitted from its tongues 6 through the substantially semi-cylindrical bearing blocks 7, the plane faces of which bear upon the plane faces 4 of jaws 3 at the end of rotary member 2. Within the permissible range of relative universal movements of the rotary members, bearing blocks 7 rotate in the cylindrical pockets or grooves formed in tongues 6. Jaws 3 being integrally connected at their inner ends to the rotary member 2, and being integrally united to each other and to this rotary member at the center of the member, there is afforded a strong construction capable of effectively transmitting high torque pressures. These pressures are distributed through the four bearing blocks having extended bearing surfaces so that the unit pressure is not large. Accordingly the bearing blocks wear away much less rapidly than in couplings so constructed that high unit pressures are imposed upon the blocks. The bearing pressure upon the blocks is further reduced by reason of the fact that the bearing faces of the lugs 3 lie in planes passing through the axis of rotation of the rotary member to which these lugs are attached. When in a coupling of this type a bearing contact plane does not pass through the axis of rotation, the bearing pressure is transmitted obliquely to the plane, and to the extent that such obliquity is present the unit resultant pressure normal to the bearing surfaces is increased. In the coupling provided according to this invention bearing pressure is transmitted normally through the bearing surfaces, and accordingly is reduced to a minimum.

According to the provisions of the patent statutes, I have explained the principle and mode of operation of my invention, and have illustrated and described what I now consider to represent its best embodiment. However, I desire to have it understood that, within the scope of the appended claim, the invention may be practiced otherwise than as specifically shown and described.

I claim as my invention:

A heavy duty universal shaft coupling for a metal working mill, comprising a rotary member provided integrally with four jaws extending longitudinally at its end and substantially radially from its axis at which the jaws are integrally united to each other and to said member, said jaws having plane surfaced driving faces lying in planes passing at right angles to each other through the axis of said member, a second rotary member integrally provided at its end with four longitudinally disposed tongues meshing with said jaws and each provided with a bearing-receiving pocket, and substantially semi-cylindrical bearing-blocks arranged in said pockets with their curved faces bearing on the tongues and their plane face bearing upon said plane faces of said jaws.

In testimony whereof, I sign my name.

RALPH C. STIEFEL.